US011338796B1

(12) United States Patent
Zhang et al.

(10) Patent No.: US 11,338,796 B1
(45) Date of Patent: May 24, 2022

(54) APPARATUS AND METHODOLOGY FOR WHEEL STABILITY MONITORING SYSTEM (71) Applicant: GM GLOBAL TECHNOLOGY OPERATIONS LLC, Detroit, MI (US)

(72) Inventors: Yubiao Zhang, Sterling Heights, MI (US); SeyedAlireza Kasaiezadeh Mahabadi, Novi, MI (US); Ehsan Asadi, North York (CA); Naser Mehrabi, Richmond Hill (CA); Hualin Tan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/124,664

(22) Filed: Dec. 17, 2020

(51) Int. Cl.
*B60W 30/02* (2012.01)
*B60W 30/18* (2012.01)
*B60W 10/10* (2012.01)
*B60W 10/06* (2006.01)
*B60W 10/08* (2006.01)

(52) U.S. Cl.
CPC ...... *B60W 30/02* (2013.01); *B60W 30/18172* (2013.01); *B60W 10/06* (2013.01); *B60W 10/08* (2013.01); *B60W 10/10* (2013.01); *B60W 2520/26* (2013.01); *B60W 2520/28* (2013.01)

(58) Field of Classification Search
CPC .......... B60W 30/02; B60W 30/18172; B60W 10/06; B60W 10/08; B60W 10/10; B60W 2520/26; B60W 2520/28
See application file for complete search history.

(56) References Cited

U.S. PATENT DOCUMENTS

| 4,750,124 | A | 6/1988 | Lin et al. |
| 6,035,251 | A | 3/2000 | Hac et al. |
| 6,282,479 | B1 | 8/2001 | Ghoneim et al. |
| 6,325,469 | B1 | 12/2001 | Carson et al. |
| 6,813,552 | B2 | 11/2004 | Ghoneim et al. |
| 6,819,998 | B2 | 11/2004 | Lin et al. |
| 6,856,885 | B2 | 2/2005 | Lin et al. |
| 6,856,886 | B1 | 2/2005 | Chen et al. |
| 6,865,468 | B2 | 3/2005 | Lin et al. |
| 6,879,898 | B2 | 4/2005 | Ghoneim et al. |

(Continued)

FOREIGN PATENT DOCUMENTS

CN        111824154 A  * 10/2020  ............ B60W 30/18

OTHER PUBLICATIONS

CN111824154A machine translation filed Sep. 28, 2021. (Year: 2021).*

*Primary Examiner* — Tisha D Lewis (57) ABSTRACT

A traction control module includes a sensor/estimation module configured to output wheel stability data based on a plurality of wheel condition inputs and a wheel stability monitoring module configured to calculate a plurality of wheel stability predictors based on the wheel stability data. Each of the wheel stability predictors is independently indicative of a wheel slip condition. The traction control module further includes a wheel stability data fusion module configured to receive each of the plurality of wheel stability predictors, combine selected wheel stability predictors from the plurality of wheel stability predictors to generate combinations of the wheel stability predictors, and selectively output a torque reduction request based on the combinations of the wheel stability predictors.

16 Claims, 6 Drawing Sheets

(56) References Cited

U.S. PATENT DOCUMENTS

| | | | |
|---|---|---|---|
| 6,968,261 | B2 | 11/2005 | Ghoneim et al. |
| 7,091,678 | B2 * | 8/2006 | Hommi ................. B60K 6/448 |
| | | | 318/52 |
| 7,099,759 | B2 | 8/2006 | Ghoneim |
| 7,181,326 | B2 | 2/2007 | Lin et al. |
| 7,274,984 | B2 | 9/2007 | Shin et al. |
| 7,392,875 | B2 * | 7/2008 | Matsuzaki ............ B60W 10/08 |
| | | | 180/247 |
| 7,440,824 | B2 | 10/2008 | Chen et al. |
| 7,571,030 | B2 | 8/2009 | Ryu et al. |
| 7,571,039 | B2 | 8/2009 | Chen et al. |
| 7,672,765 | B2 | 3/2010 | Moshchuk et al. |
| 7,788,007 | B2 | 8/2010 | Moshchuk et al. |
| 7,835,846 | B2 | 11/2010 | Chen et al. |
| 7,865,296 | B2 | 1/2011 | Ryu et al. |
| 7,908,112 | B2 | 3/2011 | Nardi et al. |
| 7,991,529 | B2 | 8/2011 | Nardi et al. |
| 8,050,838 | B2 | 11/2011 | Ryu et al. |
| 8,073,597 | B2 | 12/2011 | Nardi et al. |
| 8,078,351 | B2 | 12/2011 | Nardi et al. |
| 8,086,367 | B2 | 12/2011 | Ryu et al. |
| 8,095,309 | B2 | 1/2012 | Ryu et al. |
| 8,108,103 | B2 | 1/2012 | Moshchuk et al. |
| 8,326,487 | B2 | 12/2012 | Moschuk et al. |
| 8,428,819 | B2 | 4/2013 | Moshchuk et al. |
| 8,457,841 | B2 | 6/2013 | Knoll et al. |
| 8,855,856 | B2 | 10/2014 | Ryu et al. |
| 8,890,747 | B2 | 11/2014 | Nardi et al. |
| 8,983,722 | B2 | 3/2015 | Moshchuk et al. |
| 2005/0149243 | A1 | 7/2005 | Ghoneim |
| 2006/0064215 | A1 | 3/2006 | Turski et al. |
| 2010/0131141 | A1 | 5/2010 | Ryu et al. |
| 2017/0246957 | A1 * | 8/2017 | Ienaga ................. B60K 7/0007 |
| 2020/0255017 | A1 * | 8/2020 | Siokos ................. B60W 10/119 |

* cited by examiner

APPARATUS AND METHODOLOGY FOR WHEEL STABILITY MONITORING SYSTEM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle propulsion systems, and more particularly to traction control systems for monitoring and controlling wheel stability.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

Non-electric, electric, and hybrid vehicles may include a traction control system.

SUMMARY

A traction control module includes a sensor/estimation module configured to output wheel stability data based on a plurality of wheel condition inputs and a wheel stability monitoring module configured to calculate a plurality of wheel stability predictors based on the wheel stability data. Each of the wheel stability predictors is independently indicative of a wheel slip condition. The traction control module further includes a wheel stability data fusion module configured to receive each of the plurality of wheel stability predictors, combine selected wheel stability predictors from the plurality of wheel stability predictors to generate combinations of the wheel stability predictors, and selectively output a torque reduction request based on the combinations of the wheel stability predictors.

In other features, the plurality of wheel stability predictors correspond to a plurality of flags, and the wheel stability monitoring module is configured to selectively set the plurality of flags based on the wheel stability data.

In other features, the plurality of flags includes a wheel state flag indicative of wheel slip.

In other features, the wheel state flag is indicative of at least one of wheel speed relative to a longitudinal speed and a relationship between a slip ratio of a wheel and a torque rate of change.

In other features, the plurality of flags includes a wheel acceleration flag indicative of wheel acceleration.

In other features, the plurality of flags includes a slope flag indicative of at least one of a slope of tire longitudinal force versus slip ratio and a slope of reaction torque relative to wheel torque.

In other features, the plurality of flags includes a wheel speed phase-portrait flag indicative of a deviation between a wheel speed slope and a reference slope.

In other features, the plurality of flags includes a prediction flag indicative of a rate of change of a wheel speed slope.

In other features, the plurality of wheel stability predictors correspond a plurality of flags and the plurality of flags includes a wheel state flag indicative of wheel slip, a slope flag indicative of at least one of a slope of tire longitudinal force versus slip ratio and a slope of reaction torque relative to wheel torque, and a wheel speed phase-portrait flag indicative of a deviation between a wheel speed slope and a reference slope.

In other features, the wheel stability data fusion module is configured to generate a first output based on a first combination of the slope flag and the wheel state flag, a second output based on a second combination of the wheel speed phase-portrait flag and the wheel state flag, and a detection flag based on a third combination of the first output and the second output, and generate the torque reduction request based on the detection flag.

In other features, the plurality of flags further includes a wheel acceleration flag indicative of wheel acceleration and a prediction flag indicative of a rate of change of a wheel speed slope, and the wheel stability data fusion module is configured to generate the torque reduction request based on a fourth combination of the detection flag, the wheel acceleration flag, and the prediction flag.

In other features, the wheel stability data fusion module includes a first logical AND module configured to perform the first combination, a second logical AND module configured to perform the second combination, a first logical OR module configured to perform the third combination, and a second logical OR module configured to perform the fourth combination.

In other features, a vehicle includes the traction control module.

A method for determining wheel stability includes outputting wheel stability data based on a plurality of wheel condition inputs and calculating a plurality of wheel stability predictors based on the wheel stability data. Each of the wheel stability predictors is independently indicative of a wheel slip condition. The method further includes combining selected wheel stability predictors from the plurality of wheel stability predictors to generate combinations of the wheel stability predictors and selectively outputting a torque reduction request based on the combinations of the wheel stability predictors.

In other features, the plurality of wheel stability predictors correspond to a plurality of flags and the method further includes selectively setting the plurality of flags based on the wheel stability data.

In other features, the plurality of flags includes a wheel state flag indicative of at least one of wheel speed relative to a longitudinal speed and a relationship between a slip ratio of a wheel and a torque rate of change, a slope flag indicative of at least one of a slope of tire longitudinal force versus slip ratio and a slope of reaction torque relative to wheel torque, and a wheel speed phase-portrait flag indicative of a deviation between a wheel speed slope and a reference slope.

In other features, the method further includes generating a first output based on a first combination of the slope flag and the wheel state flag, a second output based on a second combination of the wheel speed phase-portrait flag and the wheel state flag, and a detection flag based on a third combination of the first output and the second output, and generating the torque reduction request based on the detection flag.

In other features, the plurality of flags further includes a wheel acceleration flag indicative of wheel acceleration and a prediction flag indicative of a rate of change of a wheel speed slope.

In other features, the method further includes generating the torque reduction request based on a fourth combination of the detection flag, the wheel acceleration flag, and the prediction flag.

In other features, the method further includes using a first logical AND module to perform the first combination, using a second logical AND module to perform the second combination, using a first logical OR module to perform the third combination, and using a second logical OR module to perform the fourth combination.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders to generate propulsion torque. The engine may output torque to wheels of the vehicle via a transmission. Some types of vehicles may not include an internal combustion engine or the internal combustion engine may not be mechanically coupled to a driveline of the vehicle.

An electric motor may be mechanically coupled to a shaft of the transmission. Under some circumstances, a control module of the vehicle may apply power to the electric motor from a battery to cause the electric motor to output torque for vehicle propulsion. Under other circumstances, the control module may disable power flow to the electric motor and allow the transmission to drive rotation of the electric motor. The electric motor generates power when driven by the transmission. Power generated by the electric motor can be used to recharge the battery when a voltage generated via the electric motor is greater than a voltage of the battery. The control module switches one or more switches of an inverter module to apply power to the electric motor from the battery.

A vehicle according to the present disclosure includes a traction control system that monitors wheel stability and accurately predicts wheel behavior. For example, the traction control system monitors multiple conditions indicative of wheel stability and predicts the wheel behavior using the multiple monitored conditions.

Figure 1:
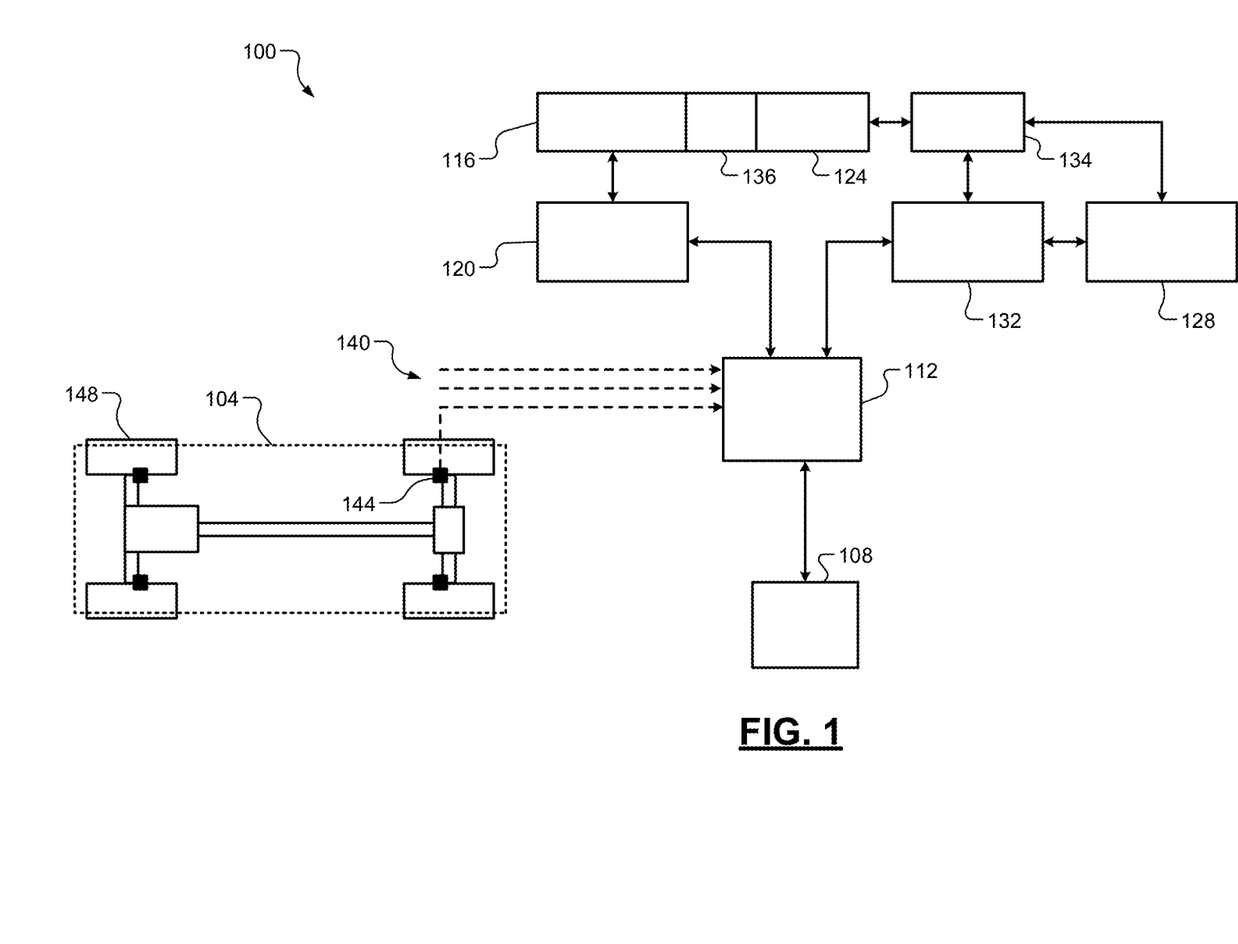
FIG. 1 is a functional block diagram of an example vehicle system.

Referring now to FIG. 1, a functional block diagram of an example vehicle system 100 is presented. While a vehicle system 100 for a hybrid vehicle 104 is shown and will be described, the present disclosure is also applicable to non-electric vehicles, electric vehicles that do not include an internal combustion engine, fuel cell vehicles, autonomous vehicles, and other types of vehicles. Also, while the example of a vehicle 104 is provided, the present application is also applicable to non-vehicle implementations.

An engine 108 may combust an air/fuel mixture to generate drive torque. An engine control module (ECM) 112 controls the engine 108. For example, the ECM 112 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 108 may be omitted.

The engine 108 may output torque to a transmission 116. A transmission control module (TCM) 120 controls operation of the transmission 116. For example, the TCM 120 may control gear selection within the transmission 116 and one or more torque transfer devices (e.g., a torque converter, one or more clutches, etc.).

The vehicle system 100 includes one or more electric motors, such as electric motor 124. An electric motor can act as either a generator or as a motor at a given time. When acting as a generator, an electric motor converts mechanical energy into electrical energy. The electrical energy can be, for example, used to charge a battery 128. When acting as a motor, an electric motor generates torque that may be used, for example, for vehicle propulsion. While the example of one electric motor is provided, the vehicle may include more than one electric motor.

A motor control module 132 controls power flow from the battery 128 to the electric motor 124 and from the electric motor 124 to the battery 128. The motor control module 132 applies electrical power from the battery 128 to the electric motor 124 to cause the electric motor 124 to output positive torque, such as for vehicle propulsion. For example, the motor control module 132 controls switching of switches of an inverter module 134. The battery 128 may include, for example, one or more batteries and/or battery packs.

The electric motor 124 may output torque, for example, to an input shaft of the transmission 116 or to an output shaft of the transmission 116. A clutch 136 may be engaged to couple the electric motor 124 to the transmission 116 and disengaged to decouple the electric motor 124 from the transmission 116. One or more gearing devices may be implemented between an output of the clutch 136 and an input of the transmission 116 to provide a predetermined ratio between rotation of the electric motor 124 and rotation of the input of the transmission 116.

The motor control module 132 may also selectively convert mechanical energy of the vehicle into electrical energy. More specifically, the electric motor 124 generates and outputs power via back EMF when the electric motor 124 is being driven by the transmission 116 and the motor control module 132 is not applying power to the electric motor 124 from the battery 128. The motor control module 132 may charge the battery 128 via the power output by the electric motor 124.

The ECM 112 may implement a traction control system according to the principles of the present disclosure (not shown in FIG. 1; described below in more detail). For example, the ECM 112 receives various wheel condition inputs 140 (i.e., inputs indicative of wheel stability), such as measurements from respective sensors 144 (e.g., wheel speed sensors arranged to measure respective rotational speeds of wheels 148). The wheel condition inputs 140 may include estimations, calculations, etc. including, but are not limited to, wheel speed, wheel acceleration, drive torque, longitudinal acceleration, yaw rate, and vehicle longitudinal speed.

Figure 2:
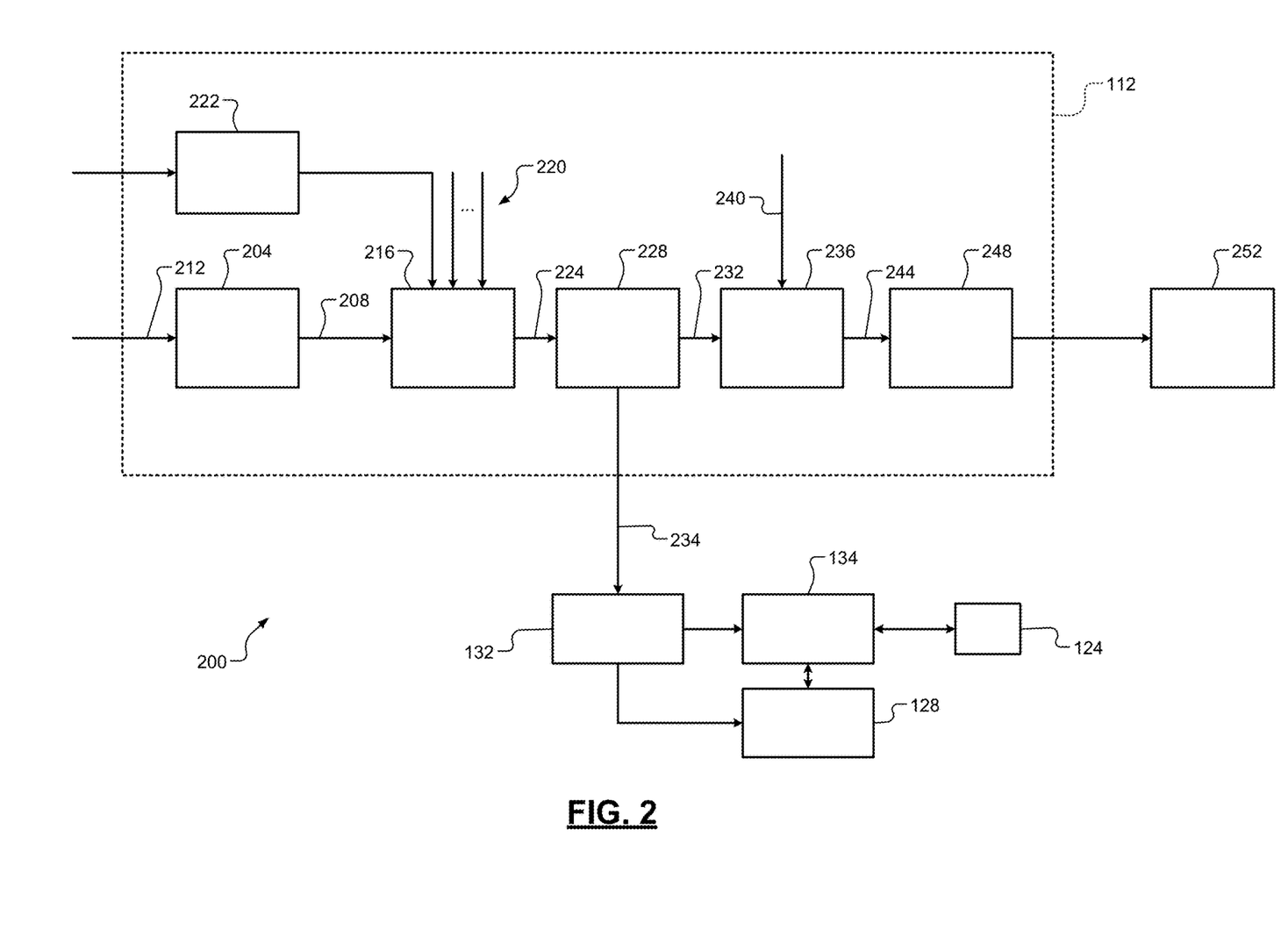
FIG. 2 is a functional block diagram of an example propulsion control system.

Referring now to FIG. 2, a functional block diagram of an example propulsion control system 200 including the ECM 112 according to the present disclosure is presented. The ECM 112 includes a driver torque module 204 that determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle 104 and objects in a path of the vehicle 104. The autonomous input may be provided by an autonomous driving system that controls movement of the vehicle 104 from location to location while avoiding objects and other vehicles. For example, the driver torque module 204 determines the driver torque request 208 based on one or more lookup tables that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels 148. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 108 and/or one or more electric motors, such as the electric motor 124. Examples of the other axle torque requests 220 include, but are not limited to, a torque reduction requested by a traction control system or module 222 when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle over-speed torque requests to reduce the axle torque to prevent the vehicle from exceeding a predetermined speed. The traction control module 222 according to the present disclosure monitors wheel stability and accurately predicts wheel behavior by monitoring multiple conditions indicative of wheel stability (e.g., the wheel condition inputs 140) as described below in more detail. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 108 and how much of the one or more axle torque requests 224 should be produced by the electric motor 124. The example of the electric motor 124 will be continued for simplicity, but multiple electric motors may be used. The hybrid module 228 outputs one or more engine torque requests 232 to a propulsion torque arbitration module 236. The engine torque requests 232 indicate a requested torque output of the engine 108.

The hybrid module 228 also outputs a motor torque request 234 to the motor control module 132. The motor torque request 234 indicates a requested torque output (positive or negative) of the electric motor 124. In vehicles where the engine 108 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 112 may be omitted, and the driver torque module 204 and the axle torque arbitration module 216 may be implemented within the motor control module 132.

In electric vehicles, the driver torque module 204 may input the driver torque request 208 to the motor control module 132 and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 108 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 132 controls switching of switches of the inverter module 134 based on the motor torque request 234. Switching of the inverter module 134 controls power flow from the battery 128 to the electric motor 124. As such, switching of the inverter module 134 controls torque of the electric motor 124. The inverter module 134 also converts power generated by the electric motor 124 and outputs power to the battery 128, for example, to charge the battery 128.

Figure 3:
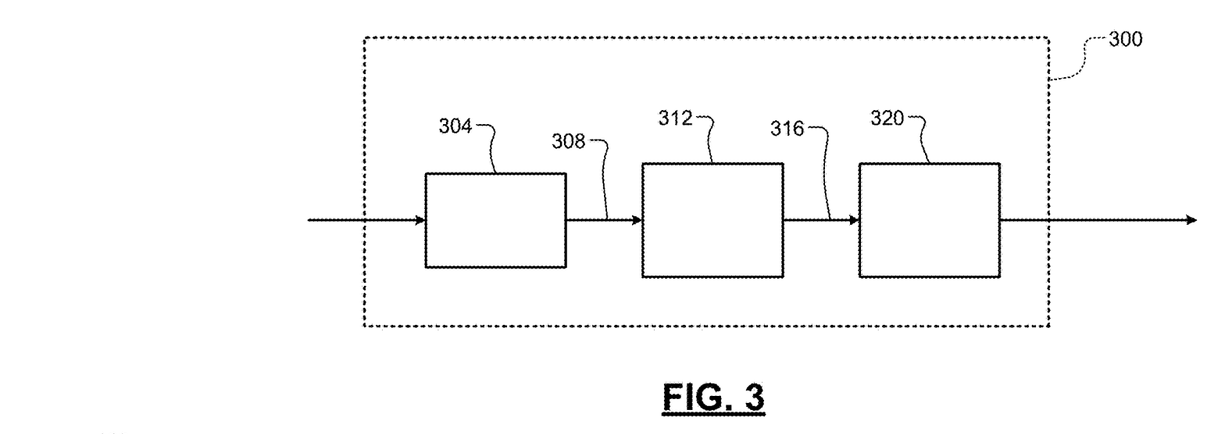
FIG. 3 is a functional block diagram of an example traction control module.

An example traction control module 300 (e.g., corresponding to the traction control module 222 of FIG. 2) according to the present disclosure is shown in FIG. 3. The traction control module 300 includes a sensor/estimation module 304. The sensor/estimation module receives the wheel condition inputs 140, which may include direct measurements from respective sensors 144 and data used for estimating and/or calculating values indicative of wheel stability. For example, the direct measurements may include measurements of wheel speed, while calculated values may include wheel acceleration. The sensor/estimation module 304 outputs wheel stability data 308 based on the sensed and calculated values. The wheel stability data 308 includes, but is not limited to, wheel speed, wheel acceleration, drive torque, longitudinal acceleration, and vehicle speed.

A wheel stability monitoring module 312 receives the wheel stability data 308 and calculates and outputs a plurality of wheel stability predictors 316 based on the wheel stability data 308. For example, the wheel stability monitoring module 312 calculates three or more of the wheel stability predictors 316. Each of the wheel stability predictors 316 may independently indicative of a wheel slip condition as described below in more detail. For example, the wheel stability predictors 316 are respective flags (e.g., binary flags having a "0" state if wheel slip is not indicated by the corresponding wheel stability data 308 or a "1" states if wheel slip is indicated) that can bet set based on the wheel stability data 308. The wheel stability predictors 316 include, but are not limited to, a slip ratio slope flag, one or more wheel state flags, and a wheel speed phase-portrait flag. In some examples, the wheel stability predictors 316 include a road condition flag (e.g., a flag that is selectively set when known road conditions meet one or more criteria).

A wheel stability data fusion module 320 receives the wheel stability predictors 316 and selectively indicates whether wheel slip is detected based on the wheel stability predictors 316. For example, the wheel stability data fusion module 320 outputs a torque reduction request (e.g., as one of the axle torque requests 220) in response to a determination that a combination of the wheel stability predictors 316 indicate that wheel slip is detected as described below in more detail.

Figure 4A:
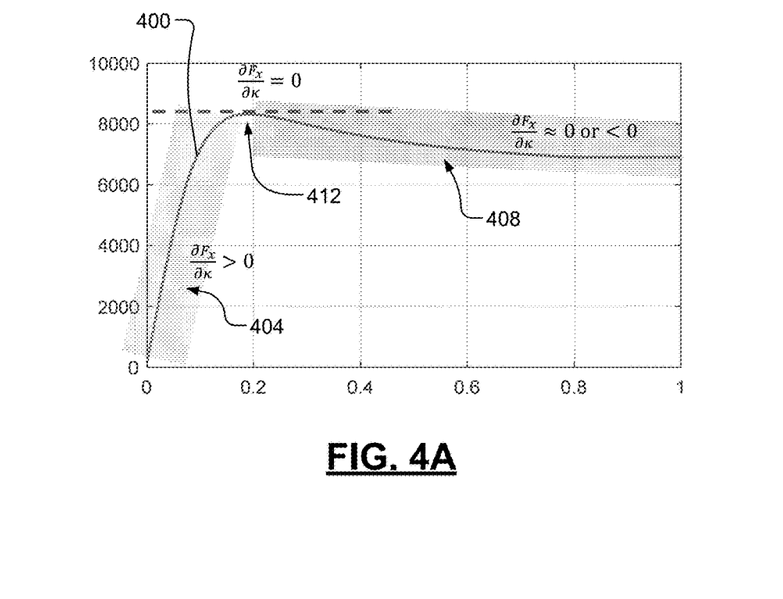
FIG. 4A illustrates a slip-ratio-based slope.

FIG. 4A illustrates a slip ratio 400 as a function of longitudinal force (N) (e.g., tire longitudinal force). For example, slip ratio corresponds to a difference between a calculated forward speed of the vehicle 104 (e.g., as expected, based on a rotational wheel speed) and an actual speed of the vehicle 104. A slip ratio slope is greater than zero $$\left(\frac{\partial F_x}{\partial \kappa} > 0\right)$$

in a first region 404 less than or equal to zero $$\left(\frac{\partial F_x}{\partial \kappa} \approx 0 \text{ or } < 0\right)$$

in a second region 408. A positive slip ratio slope (i.e., in the first region 404) indicates satisfactory wheel stability. Conversely, a zero or negative slip ratio slope (i.e., in the second region 408) may indicate wheel instability. Accordingly, the wheel stability monitoring module 312 may monitor the slip ratio and set the slip ratio slope flag in response to a determination that the slip ratio slope is transitioning from the first region 404 to the second region 408 (e.g., at 412).

Figure 4B:
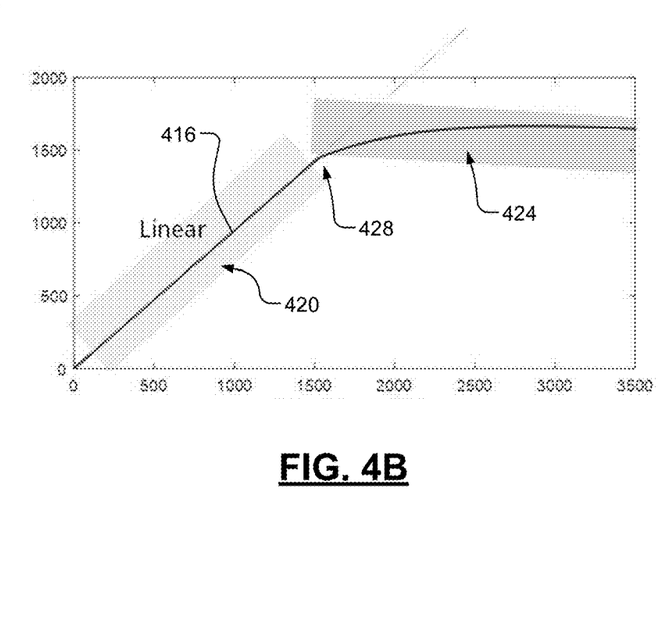
FIG. 4B illustrates a wheel-torque-based slope.

In some examples, the wheel stability monitoring module 312 may also monitor wheel torque 416 as shown in FIG. 4B and selectively set a wheel torque slope flag accordingly. The wheel torque 416 is shown as a function of reaction torque (e.g., an estimated tire rotational force transferred to the ground, in Nm). A wheel torque slope is positive and generally linear in a first region 420 and nonlinear in a second region 424. A linear wheel torque slope (i.e., in the first region 420) indicates satisfactory wheel stability. Conversely, nonlinear wheel torque slope (i.e., in the second region 424) may indicate wheel instability. Accordingly, the wheel stability monitoring module 312 may monitor the wheel torque and set a wheel torque slope flag in response to a determination that the wheel torque slope is transitioning from the first region 420 to the second region 424 (e.g., at 428).

In this manner, the wheel stability monitoring module 312 may selectively set one or both of the slip ratio slope flag and the wheel torque slope flag. In some examples, the wheel stability monitoring module 312 may set a single slope flag in response to a determination that either of the slip ratio slope flag and the wheel torque slope flag is set (e.g., the slope flag may be set based on a logical OR combination of the slip ratio slope flag and the wheel torque slope flag). In other words, the wheel stability monitoring module 312 may set the slope flag in response to a determination of either of (i) the slip ratio slope is transitioning from the first region 404 to the second region 408 and (ii) the wheel torque slope is transitioning from the first region 420 to the second region 424.

The one or more wheel state flags may include, but are not limited to, a wheel acceleration flag, a relative wheel speed flag, and a slip-torque change flag. For example, the wheel stability monitoring module 312 may set the wheel acceleration flag in response to a determination that wheel acceleration exceeds a predetermined wheel acceleration threshold (e.g., a calibrated wheel acceleration threshold indicative of wheel slip). In an example, the wheel stability monitoring module 312 may set the wheel state flag in response to a determination that the wheel acceleration flag is set.

A relative wheel speed may correspond to a difference between a rotational speed of the wheel and a longitudinal speed of the wheel (e.g., measured or estimated at a location such as a wheel hub). The wheel stability monitoring module 312 may set the relative wheel speed flag in response to a determination that the relative wheel speed exceeds a predetermined relative wheel threshold (e.g., a calibrated relative wheel speed threshold indicative of wheel slip).

A slip-torque change may correspond to a relationship between the slip ratio and a torque rate of change. For example, slip ratio and torque rate of change may correspondingly increase in a generally linear manner. A difference between the slip ratio and the torque rate of change may be constant or generally linear. The wheel stability monitoring module 312 may set the slip-torque change flag in response to a determination that the difference between the slip ratio and the torque rate of change exceeds a predetermined slip-torque change threshold (e.g., a calibrated slip-torque change threshold indicative of wheel slip).

In an example, the wheel stability monitoring module 312 may set the wheel state flag in response to a determination that both the relative wheel speed flag and the slip-torque change flag are set (e.g., the wheel state flag may be set based on a logical AND combination of the relative wheel speed flag and the slip-torque change flag).

Figure 4C:
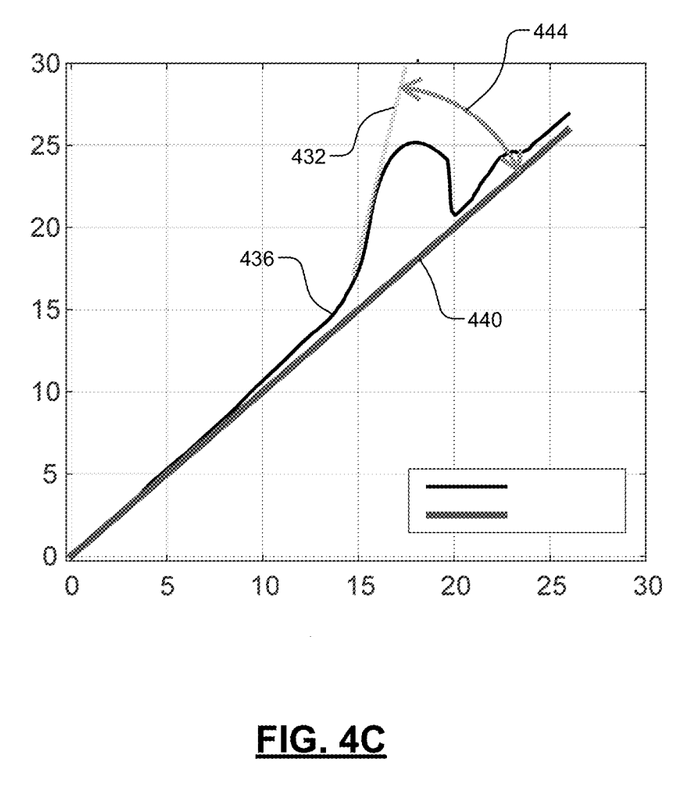
FIG. 4C illustrates a deviation between a wheel speed slope and a reference slope.

As shown in FIG. 4C, the wheel stability monitoring module 312 may set a wheel speed phase-portrait flag based on a deviation between a calculated slope 432 of wheel speed 436 (e.g., illustrated as an equivalent rotational wheel speed relative to a longitudinal wheel speed at a wheel hub)

and a reference slope 440. For example, the reference slope 440 may correspond to a slope of the wheel speed 436 while wheel stability is satisfactory (e.g., a predicted or calibrated slope during normal operating conditions). The wheel stability monitoring module 312 monitors the slope 432 and determines whether a difference between the slope 432 and the reference slope 440 (e.g., a deviation angle 444) exceeds a predetermined deviation threshold (e.g., a calibrated deviation threshold indicative of wheel slip). The wheel stability monitoring module 312 sets the wheel speed phase-portrait flag in response to a determination that the deviation angle 444 exceeds the predetermined deviation threshold.

In some examples, the wheel stability monitoring module 312 may predict wheel states based on changes in the slope 432. For example, the wheel stability monitoring module 312 calculates a rate of change of the slope 432 as the slope 432 beings to deviate from the reference slope 440. If the rate of change of the slope 432 exceeds a predetermined rate of change, the wheel stability monitoring modules 312 may set a predicted wheel slip flag.

Figure 5:
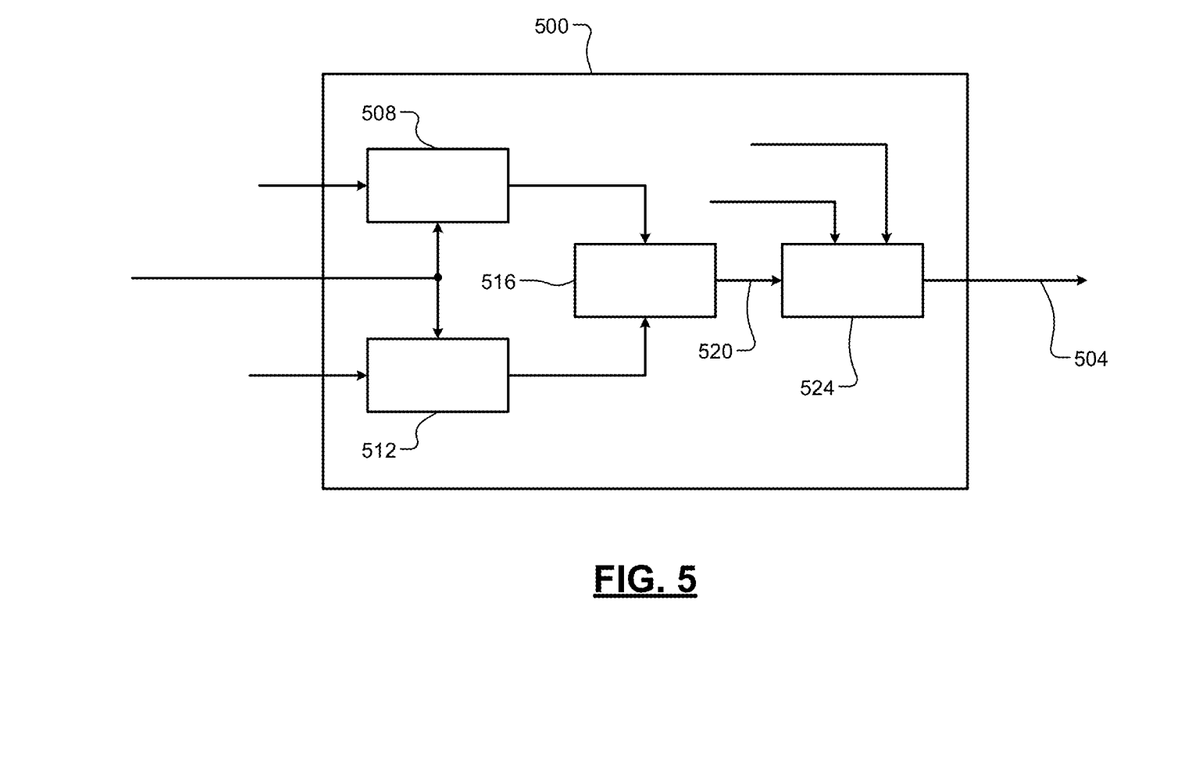
FIG. 5 is a functional block diagram of an example wheel stability data fusion module.

Referring now to FIG. 5, an example wheel stability data fusion module 500 (e.g., corresponding to the wheel stability data fusion module 320) is shown. The wheel stability data fusion module 500 receives the flags (as the wheel stability predictors 316) and selectively outputs a wheel instability flag 504 based on the flags. For example, the wheel stability data fusion module 500 combines or fuses the flags output by the wheel stability monitoring module 312 to selectively set the wheel instability flag 504. The wheel instability flag 504 may correspond to a torque reduction request. As shown, the wheel stability data fusion module 500 is implemented as one or more logical circuits or modules. In other examples, the wheel stability data fusion module 500 may include a processor executing software corresponding to the described logical modules. In some examples, the wheel stability data fusion module 500 may be configured to execute other suitable data fusion processing, such as a Kalman filter, a membership function, etc.

A logical AND circuit or module 508 receives the slope flag and the wheel state flag. Accordingly, an output of the logical AND module 508 indicates whether both the slope flag and the wheel state flag are set. Similarly, a logical AND circuit or module 512 receives the wheel speed phase-portrait flag and the wheel state flag. Accordingly, an output of the logical AND module 512 indicates whether both the wheel speed phase-portrait flag and the wheel state flag are set. In this manner, the logical AND modules 508 and 512 reduce false positives that may occur when only one of the slope flag, the wheel state flag, and the wheel speed phase-portrait flag is set. Conversely, a logical OR circuit or module 516 receives the respective outputs of the logical AND modules 508 and 512 and outputs a detection flag (e.g., a fused detection flag) 520 accordingly. In other words, the logical OR module 516 sets the detection flag if either of (i) both the slope flag and the wheel state flag are set or (ii) both the wheel speed phase-portrait flag and the wheel state flag are set.

A logical OR circuit or module 524 receives the detection flag 520, the predicted wheel slip flag, and the wheel acceleration flag. Accordingly, an output of the logical OR circuit (i.e., the wheel instability flag 504) indicates whether any one of the detection flag 520, the predicted wheel slip flag, and the wheel acceleration flag is set. Outputs of the logical AND modules 508 and 512 and the logical OR modules 516 and 524 correspond to combinations of the wheel stability predictors 316 (i.e., respective flags) that are independently indicative of a wheel slip condition. In other words, the wheel stability data fusion module 500 fuses data corresponding to the individual wheel stability predictors 316 to generate the wheel instability flag.

Figure 6:
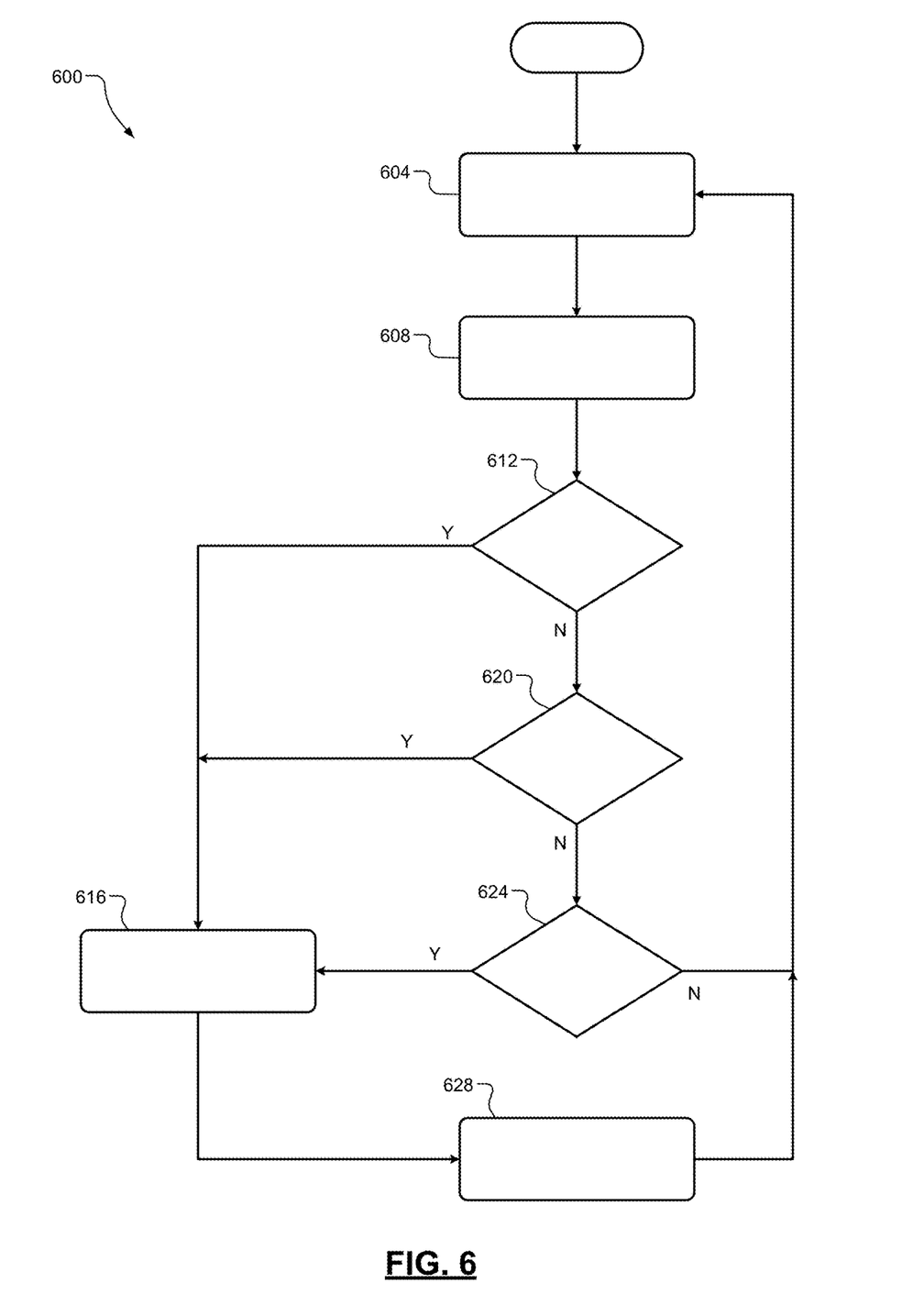
FIG. 6 illustrate steps of an example method for determining wheel stability.

FIG. 6 illustrate steps of an example method 600 for determining wheel stability. At 604, the method 600 (e.g., the sensor/estimation module 304) receives the wheel condition inputs and outputs wheel stability data based on the wheel condition inputs. At 608, the method 600 (e.g., the wheel stability monitoring module 312 receives the wheel stability data and selectively sets one or more flags indicative of wheel stability based on the wheel stability data. For example, the method 600 selectively sets flags including, but not limited to, a wheel state flag, a slopes flag, a wheel speed phase-portrait flag, a predicted wheel slip flag, and a wheel acceleration flag.

At 612, the method 600 (e.g., the wheel stability data fusion module 320) determines whether the wheel acceleration flag is set. If true, the method 600 continues to 616. If false, the method 600 continues to 620. At 616, the method 600 (e.g., the wheel stability data fusion module 320) outputs a wheel instability flag (e.g., corresponding to a torque reduction request).

At 620, the method 600 (e.g., the wheel stability data fusion module 320) determines whether the predicted wheel slip flag is set. If true, the method 600 continues to 616 and outputs the wheel instability flag. If false, the method 600 continues to 624.

At 624, the method 600 (e.g., the wheel stability data fusion module 320) determines whether to set a detection flag. For example, the method 600 determines whether either of (i) the slopes flag and the wheel state flag are set or (ii) the wheel speed phase-portrait flag and the wheel state flag are set. If true, the method 600 (e.g., the wheel stability data fusion module 320) continues to 616 and outputs the wheel instability flag. For example, the method 600 sets a detection flag and outputs the wheel instability flag in response to the detection flag being set. If false, the method 600 continues to 604.

If the method 600 outputs the wheel instability flag at 616, the method 600 continues to 628. At 628, the method 600 (e.g., the axle torque arbitration module 216) generates a torque request to adjust vehicle torque based on the wheel instability flag and continues to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A traction control module comprising:
    a sensor/estimation module configured to output wheel stability data based on a plurality of wheel condition inputs;
    a wheel stability monitoring module configured to calculate a plurality of wheel stability predictors based on the wheel stability data, wherein each of the wheel stability predictors is independently indicative of a wheel slip condition; and
    a wheel stability data fusion module configured to (i) receive each of the plurality of wheel stability predictors, (ii) combine selected wheel stability predictors from the plurality of wheel stability predictors to generate combinations of the wheel stability predictors, and (iii) selectively output a torque reduction request based on the combinations of the wheel stability predictors, wherein the plurality of wheel stability predictors corresponds to a plurality of flags, and wherein the wheel stability monitoring module is configured to selectively set the plurality of flags based on the wheel stability data, and wherein the plurality of flags includes a slope flag indicative of at least one of (i) a slope of tire longitudinal force versus slip ratio and (ii) a slope of reaction torque relative to wheel torque.

2. The traction control module of claim 1, wherein the plurality of flags includes a wheel state flag indicative of wheel slip.

3. The traction control module of claim 2, wherein the wheel state flag is indicative of at least one of (i) wheel speed relative to a longitudinal speed and (ii) a relationship between a slip ratio of a wheel and a torque rate of change.

4. The traction control module of claim 1, wherein the plurality of flags includes a wheel acceleration flag indicative of wheel acceleration.

5. The traction control module of claim 1, wherein the plurality of flags includes a wheel speed phase-portrait flag indicative of a deviation between a wheel speed slope and a reference slope.

6. The traction control module of claim 1, wherein the plurality of flags includes a prediction flag indicative of a rate of change of a wheel speed slope.

7. A traction control module, comprising:
    a sensor/estimation module configured to output wheel stability data based on a plurality of wheel condition inputs;
    a wheel stability monitoring module configured to calculate a plurality of wheel stability predictors based on the wheel stability data, wherein each of the wheel stability predictors is independently indicative of a wheel slip condition; and
    a wheel stability data fusion module configured to (i) receive each of the plurality of wheel stability predictors, (ii) combine selected wheel stability predictors from the plurality of wheel stability predictors to generate combinations of the wheel stability predictors, and (iii) selectively output a torque reduction request based on the combinations of the wheel stability predictors,
    wherein the plurality of wheel stability predictors correspond a plurality of flags, and wherein the plurality of flags comprises:
    a wheel state flag indicative of wheel slip;
    a slope flag indicative of at least one of (i) a slope of tire longitudinal force versus slip ratio and (ii) a slope of reaction torque relative to wheel torque; and
    a wheel speed phase-portrait flag indicative of a deviation between a wheel speed slope and a reference slope.

8. The traction control module of claim 7, wherein the wheel stability data fusion module is configured to:
    generate (i) a first output based on a first combination of the slope flag and the wheel state flag, (ii) a second output based on a second combination of the wheel speed phase-portrait flag and the wheel state flag, and (iii) a detection flag based on a third combination of the first output and the second output; and
    generate the torque reduction request based on the detection flag.

9. The traction control module of claim 8, wherein the plurality of flags further comprises a wheel acceleration flag indicative of wheel acceleration and a prediction flag indicative of a rate of change of a wheel speed slope, and wherein the wheel stability data fusion module is configured to generate the torque reduction request based on a fourth combination of the detection flag, the wheel acceleration flag, and the prediction flag.

10. The traction control module of claim 9, wherein the wheel stability data fusion module comprises:
    a first logical AND module configured to perform the first combination;
    a second logical AND module configured to perform the second combination;
    a first logical OR module configured to perform the third combination; and
    a second logical OR module configured to perform the fourth combination.

11. A vehicle comprising the traction control module of claim 1.

12. A method for determining wheel stability, the method comprising:
    outputting wheel stability data based on a plurality of wheel condition inputs;
    calculating a plurality of wheel stability predictors based on the wheel stability data, wherein each of the wheel stability predictors is independently indicative of a wheel slip condition;
    combining selected wheel stability predictors from the plurality of wheel stability predictors to generate combinations of the wheel stability predictors;
    selectively outputting a torque reduction request based on the combinations of the wheel stability predictors;
    wherein the plurality of wheel stability predictors correspond to a plurality of flags, the method further comprising selectively setting the plurality of flags based on wheel stability data; and
    wherein the plurality of flags includes a wheel state flag indicative of at least one of (i) wheel speed relative to a longitudinal speed and (ii) a relationship between a slip ratio of a wheel and a torque rate of change, a slope flag indicative of at least one of (i) a slope of tire longitudinal force versus slip ratio and (ii) a slope of reaction torque relative to wheel torque, and a wheel speed phase-portrait flag indicative of a deviation between a wheel speed slope and a reference slope.

13. The method of claim 12, further comprising:
    generating (i) a first output based on a first combination of the slope flag and the wheel state flag, (ii) a second output based on a second combination of the wheel speed phase-portrait flag and the wheel state flag, and (iii) a detection flag based on a third combination of the first output and the second output; and
    generating the torque reduction request based on the detection flag.

14. The method of claim 13, wherein the plurality of flags further comprises a wheel acceleration flag indicative of wheel acceleration and a prediction flag indicative of a rate of change of a wheel speed slope.

15. The method of claim 14, further comprising generating the torque reduction request based on a fourth combination of the detection flag, the wheel acceleration flag, and the prediction flag.

16. The method of claim 15, further comprising:
    using a first logical AND module to perform the first combination;
    using a second logical AND module to perform the second combination;
    using a first logical OR module to perform the third combination; and using a second logical OR module to perform the fourth combination.

* * * * *